United States Patent [19]

Hara

[11] Patent Number: 5,040,224

[45] Date of Patent: Aug. 13, 1991

[54] FINGERPRINT PROCESSING SYSTEM CAPABLE OF DETECTING A CORE OF A FINGERPRINT IMAGE BY STATISTICALLY PROCESSING PARAMETERS

[75] Inventor: Masanori Hara, Tokyo, Japan

[73] Assignee: NEC Corporation, Tokyo, Japan

[21] Appl. No.: 342,047

[22] Filed: Apr. 24, 1989

[30] Foreign Application Priority Data

Apr. 23, 1988 [JP] Japan ................................ 63-99334
Apr. 23, 1988 [JP] Japan ................................ 63-99335
Apr. 23, 1988 [JP] Japan ................................ 63-99336

[51] Int. Cl.⁵ ............................................. G06K 9/00
[52] U.S. Cl. ............................................ 382/4; 382/5
[58] Field of Search .................................. 382/4, 5, 39

[56] References Cited

U.S. PATENT DOCUMENTS 4,151,512  4/1979  Piganati et al. ......................... 382/5
4,185,270  1/1980  Fischer et al. .......................... 382/5
4,310,827  1/1982  Asai ........................................ 382/5
4,747,147  5/1988  Sparrow .................................. 382/5

FOREIGN PATENT DOCUMENTS 58-55549  12/1983  Japan .
59-27945   7/1984  Japan .

Primary Examiner—David K. Moore
Assistant Examiner—Jose L. Couso
Attorney, Agent, or Firm—Sughrue, Mion, Zinn, Macpeak & Seas

[57] ABSTRACT

In a fingerprint processing system for use in detecting a core position of a fingerprint image quantized into a plurality of picture elements, statistical processing is carried out in relation to parameters which are variable in dependency upon the core position and directions and curvatures of the picture elements preliminarily detected to specify ridges of the fingerprint image. The parameters may be existence probabilities of the core position that are determined for the directions and the curvatures. Such existence probabilities are successively calculated at each picture element and adjacent picture elements to be summed up and to detect a maximum one of the existence probabilities. A position which has the maximum existence probability is judged as the core position. Alternatively, the parameters may be differences between practical curvatures extracted from the fingerprint image and reference curvatures defining a reference curve. A minimum one of the differences is statistically detected with reference to various kinds of the reference curves. In addition, the directions and the curvatures of the picture elements may be determined by deriving the density levels of the picture elements along a plurality of arcuate lines specified by line directions and line curvatures.

2 Claims, 11 Drawing Sheets

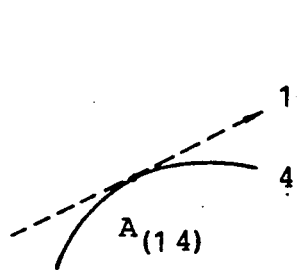
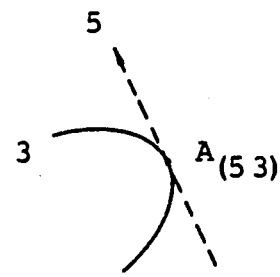
FIG.18            FIG.19
| -1 | -1 | -1 | -1 | -1 | 0 | 0 |
|---|---|---|---|---|---|---|
| -1 | -1 | -1 | -1 | 0 | 0 | 0 |
| -1 | -1 | -1 | 0 | 0 | 0 | +1 |
| -1 | -1 | 0 | 0 | +1 | +1 | +1 |
| -1 | 0 | 0 | +1 | +1 | +2 | +1 |
| 0 | 0 | 0 | +1 | +2 | +4 | +2 |
| 0 | 0 | +1 | +1 | +1 | +2 | +1 |
$A_{(1\ 4)}$
FIG.20
| 0 | 0 | -1 | -1 | -3 | -3 | -5 |
|---|---|---|---|---|---|---|
| 0 | 0 | 0 | -1 | -3 | -5 | -3 |
| 0 | 0 | 0 | 0 | -5 | -3 | -3 |
| +1 | +1 | +2 | +3 | 0 | -1 | -1 |
| +2 | +5 | +5 | +2 | 0 | 0 | -1 |
| +3 | +5 | +5 | +1 | 0 | 0 | 0 |
| +5 | +3 | +2 | +1 | 0 | 0 | 0 |
$A_{(5\ 3)}$
FIG.21

FINGERPRINT PROCESSING SYSTEM CAPABLE OF DETECTING A CORE OF A FINGERPRINT IMAGE BY STATISTICALLY PROCESSING PARAMETERS

BACKGROUND OF THE INVENTION

This invention relates to a fingerprint processing system for use in processing a fingerprint image to detect a position of a core in the fingerprint image and/or to detect directions and curvatures of ridges of the fingerprint image prior to detection of the position of the core.

It is a recent trend that a fingerprint is processed to be automatically identified by a pattern recognition technique in an electronic computer. Automatical identification of the fingerprint is made with reference to abrupt endings, bifurcations, and branches which are extracted from a fingerprint image and which may be collectively called minutiae. In order to accurately identify or collate the fingerprint, it is necessary to detect directions of ridges of the fingerprint and to decide a position of a core in the fingerprint, prior to identification of a fingerprint by the use of such minutiae. Detection of the directions and decision of the position of the core will be collectively referred to as preliminary processing hereinafter.

Heretofore, preliminary processing is carried out by processing a sequence of picture elements of a fingerprint image which is two-dimensionally quantized and which appears as a black-and-white image. The picture elements are arranged on a predetermined coordinate system, for example, an orthogonal coordinate system. More specifically, proposal has been proposed in Japanese Patent Publication No. Syô 52-97298, namely, 97298/1977, about detecting directions of ridges by the use of the fact that a black-and-white level or a density level of picture elements in the black-and-white image is scarcely varied when each ridge is traced along the same direction as each direction of the ridges while the density level is largely varied when each ridge is traced along a direction orthogonal to each direction of the ridges. For this purpose, the fingerprint image is traced on the straight from each picture element to calculate a variation of the density level. Such straight tracing of the fingerprint image, however, makes it difficult to calculate a curvature of each ridge in principle. In addition, a large variation of the density level takes place on the straight tracing also at an area, such as a core of the fingerprint, a triangle portion, because a curvature is very large in the area.

In order to determine a core in a fingerprint image having a plurality of ridges laid from an upper portion of the fingerprint image to a lower portion, the ridges have been successively traced in Japanese Patent Publication No. Syô 58-55549, namely 55549/1983, from the upper portion towards the lower portion to detect a summit or top portion of each ridge and to decide a top position of an innermost one of the ridges as the core of the fingerprint image.

Herein, it is to be noted that there are various types of fingerprints, such as arches, loops, whorls, and the like, and that no innermost ridge is present in a fingerprint of an arch type. Accordingly, it is difficult to determine a position of the core in the fingerprint of the arch type.

Moreover, it frequently happens that fingerprint images have a low quality of images and are unclear at center portions of the fingerprint images. In this event, it is difficult with the above-mentioned method to determine cores in such fingerprints of low quality without any help of an operator. Therefore, it takes a long time to adjust and confirm each position of the cores by the operator.

SUMMARY OF THE INVENTION

It is an object of this invention to provide a fingerprint processing system which is capable of effectively processing a fingerprint image prior to identification of the fingerprint image.

It is another object of this invention to provide a fingerprint processing system of the type described, which can detect a curvature of each ridge of the fingerprint image.

It is still another object of this invention to provide a fingerprint processing system which can correctly determine a position of a core in each fingerprint image without any help of an operator even in a fingerprint of an arch type or in a fingerprint image of low quality.

It is yet another object of this invention to provide a fingerprint processing system which can detect a direction and a curvature of each ridge of the fingerprint image even when the fingerprint image has locally a large curvature.

According to an aspect of this invention, there is provided fingerprint processing system for use in detecting a position of a core in a fingerprint image which has a plurality of ridges. Each has a curvature and a direction. The ridges are quantized into picture elements together with their background. The system comprises a direction and curvature memory having a plurality of memory addresses in correspondence to the picture elements, respectively, for memorizing curvature signals and direction signals and a processing unit coupled to the curvature and direction memory for successively processing the curvature signals and the direction signals to detect the position of the core. The curvature and the direction signals are extracted from the picture elements to represent the curvature and the directions, respectively. The processing unit comprises statistically processing means coupled to the curvature and direction memory for successively and statistically processing the curvature and direction signals at each picture element to calculate parameters variable in dependency upon the position of the core and upon the curvatures and the directions of the ridges and position determining means connected to the statistically processing means for determining the position from the parameters.

According to another aspect of this invention, there is provided a fingerprint processing system for use in processing a fingerprint image quantized into picture elements two-dimensionally arranged to detect, at each of the picture elements, a direction and a curvature related to ridges of the fingerprint image. The system comprises an image memory having a plurality of memory addresses for memorizing density levels of the respective picture elements and processing means coupled to the image memory for processing the density levels of the picture elements to decide the direction and the curvatures at every one of the picture elements. The processing means comprises signal producing means for producing a reference address signal specifying a reference memory address in the memory addresses together with a direction signal and a curvature signal which are representative of a line direction and a line curvature of each of arcuate lines, address signal producing means responsive to the reference address signal and the direction and the curvature signals for successively supplying a plurality of the memory addresses to the image memory so that the density levels of the picture elements are read out of the image memory along each of the arcuate lines, calculating means coupled to the image memory and responsive to the density levels for the arcuate lines for calculating variations of the density levels for the arcuate lines to detect a minimum one of the variations for the arcuate lines, and determining means coupled to the calculating means for determining the direction and the curvature at each of the picture elements from the minimum one of the variations.

BRIEF DESCRIPTION OF THE DRAWING

FIGS. 18 and 19 show views for use in describing representations of arcuate lines or curves used in FIG. 17;

FIGS. 20 and 21 exemplify relationships between the arcuate lines and adjacent existence probabilities;

DESCRIPTION OF THE PREFERRED EMBODIMENTS

Figure 1:
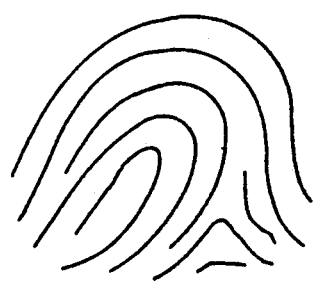
FIGS. 1 through 3 exemplify three types of fingerprints to facilitate an understanding of this invention.
Figure 2:
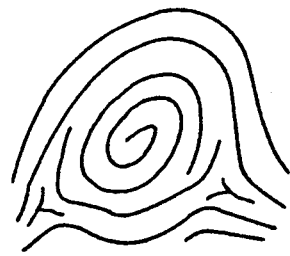
Figure 3:

Referring to FIGS. 1 through 5, fingerprints are exemplified for a better understanding of this invention. The fingerprint illustrated in FIG. 1 is generally called a loop type fingerprint specified by ridges making a backward turn while the fingerprints in FIGS. 2 and 3 are generally called whorl and arch type fingerprints which are specified by a central ridge turned to form at least one circle and ridges making no backward turn, respectively. At any rate, it is of importance to determine positions of cores, namely, core positions in fingerprints as illustrated in FIGS. 1 through 3 so as to automatically identify each fingerprint by the use of a pattern recognition technique.

As already mentioned in the preamble of the instant specification, it is possible to determine the positions of the cores in the loop and the whorl type fingerprints by taking advantage of a conventional method disclosed in Japanese Patent Publication No. Syô 58-55549 referenced in the preamble of the instant specification, whereas it is difficult to determine a position of a core in the arch type fingerprint shown in FIG. 3.

Figure 4:
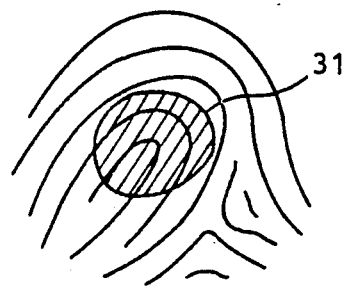
FIGS. 4 and 5 exemplify fingerprints which locally have unclear portions.
Figure 5:
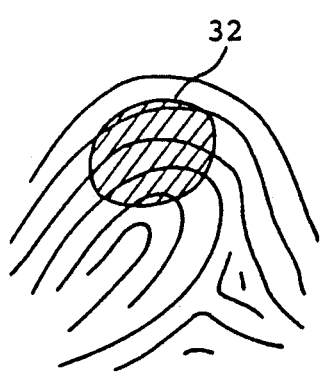

In addition, when a center portion of an upper portion of a fingerprint is nuclear or indistinct, as symbolized by shaded portions 31 and 32 in FIGS. 4 and 5, the positions of the cores can not be determined by the conventional method even when the fingerprints are whorl or loop type fingerprints.

Figure 6:
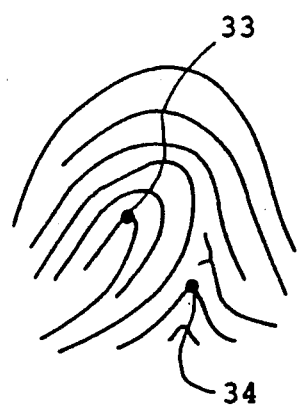
FIG. 6 exemplifies a fingerprint having a triangle shaped portion which may be wrongly judged as a core position.

Referring to FIG. 6, a loop type fingerprint is illustrated which has not only loop shaped ridges but also triangle shaped ridges. According to the above-referenced method, a top position 33 of an innermost one of the loop shaped ridges is recognized as a position of a core in the illustrated loop type fingerprint. However, an apex 34 of one of the triangle shaped ridges may be also erroneously recognized as a position of the core.

In FIG. 6, let a direction of each ridge be determined by the use of a method which is disclosed in Japanese Patent Publication No. Syô 52-97298 referenced in the preamble of the instant specification. Each ridge is traced on the straight to calculate a variation of the black-and-white level or the density level according to the method. In this event, a large variation of the density level is detected when each ridge is traced along a direction orthogonal to a direction of each ridge. However, such a variation of the density level is also detected at the top position 33 of the innermost ridge and the apex 34 of the triangle shaped ridge even when the innermost and the triangle shaped ridges are traced along their directions. In addition, it is difficult to determine a curvature by the method, as already pointed out.

Figure 7:
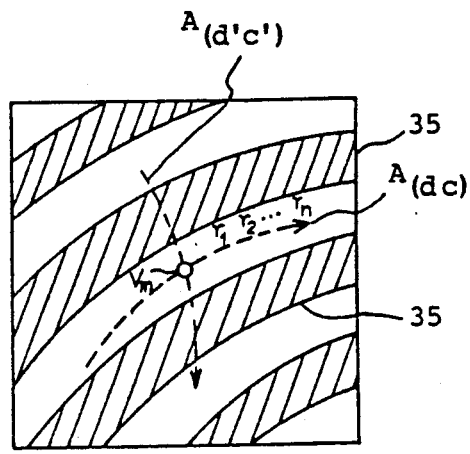
FIG. 7 shows an enlarged view of a part of a fingerprint for use in describing a principle of this invention.

Referring to FIG. 7, description will be made as regards the principles of this invention which are for use in detecting a direction and a curvature of a ridge in a fingerprint having a part which is depicted in FIG. 7 on an enlarged scale. The illustrated fingerprint has a plurality of stratiform ridges 35 with furrow portions left between adjacent ones of the ridges 35 and may be recognized as a fingerprint image or remain which is quantized into a plurality of picture elements two-dimensionally arranged. Since the directions and the curvatures of the ridges in the fingerprint are very stable information, such information can be effectively used to identify the fingerprint if the information is correctly derived from the fingerprint image.

Let a selected one of the stratiform ridges 35 have a curvature represented by c and a ridge direction which is specified by a tangential line of the selected stratiform ridge 35 and which is represented by d. It is assumed that an arcuate line is determined in the furrow portion and has a curvature and a direction equal to those of the selected ridge. In this connection, the arcuate line is represented by $A_{dc}$ and is extended from a center picture element Vm through first through n-th picture elements distant from the center picture element Vm by quantization distances $r_l$ and $r_n$, respectively. Accordingly, density levels of the first through n-th picture elements on the arcuate line $A_{dc}$ can be represented by $L_{dc}1$, $L_{dc}2$, ..., $L_{dc}n$, respectively. Under the circumstances, a variation of the density levels scarcely takes place when the fingerprint image is traced along the arcuate line $A_{dc}$, provided that any dust or contamination does not exist along the arcuate line $A_{dc}$.

Under the circumstances, difference between adjacent ones of the density levels $L_{dc}1$ to $L_{dc}n$ extracted from the first through n-th picture elements are successively added to one another along the arcuate line $A_{dc}$ to calculate a sum value of the differences. Similar additions are carried out to calculate sum values along various kinds of arcuate lines passing through the center picture element Vm. In this case, a minimum value of the sum values is given when the arcuate line has the curvature and the direction equal to those of the ridge and is coincident with $A_{dc}$. In other words, it is possible to determine the curvature and the direction of the ridge by detecting the minimum one of the sum values calculated in the above-mentioned manner.

Figures 8, 9:
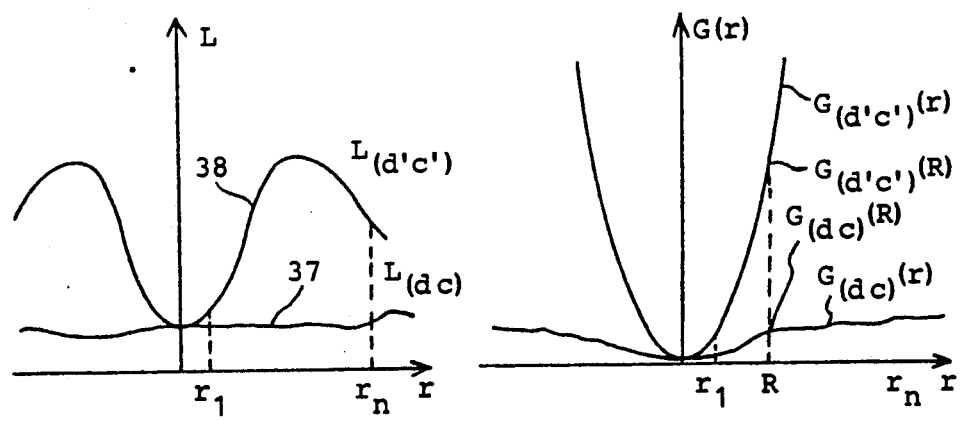
FIG. 8 is a graphical representation of density levels of picture elements arranged along different arcuate curves.
FIG. 9 is a similar graphical representation of integral values of the density levels of the picture elements mentioned in FIG. 8.

Referring to FIG. 8, first and second curves 37 and 38 show variations of density levels (depicted at L in FIG. 8) appearing at positions remote by the quantization distances $r_1$ to $r_n$ from the center picture element Vm when the fingerprint illustrated in FIG. 7 is traced along the arcuate lines $A_{dc}$ and $A_{d'c'}$, respectively. As readily understood from the first curve 37, the variation of the density levels $L_{dc}$ is scarce when the fingerprint is traced along the arcuate line $A_{dc}$ while the variation of the density levels $L_{d'c'}$ is very large when the fingerprint is traced along the arcuate line $A_{d'c'}$ intersecting the ridges as shown in FIG. 7.

Referring to FIG. 9, wherein an abscissa and an ordinate represent a distance r from the center picture element Vm and an integral value G(r), respectively, the integral value G(r) is calculated as a function of the distance r from the center picture element Vm by integrating variations between the density levels of adjacent picture elements arranged along the first and the second curves $A_{dc}$ and $A_{d'c'}$ illustrated in FIG. 7. More specifically, the integral value G(r) is calculated by the use of a discrete representation by:

$$G(r) = \sum_{i=1}^{n} g(|f(ri) - f(r(i-1))|), \qquad (1)$$

where g is representative of a monotonically increasing function preselected and f(ri), the density level at the quantization distance ri.

In accordance with Equation (1), first and second integral value curves $G_{dc}(r)$ and $G_{d'c'}(r)$ are calculated along the first and the second curves $A_{dc}$ and $A_{d'c'}$, respectively. As a result, the first and the second integral value curves $G_{dc}(r)$ and $G_{d'c'}(r)$ take first and second integral values represented by $G_{dc}(R)$ and $G_{d'c'}(R)$ at a quantization distance R, respectively. As shown in FIG. 9, the second integral value $G_{d'c'}(R)$ is very large as compared with the first integral value $G_{dc}(R)$. In other words, the variation of the first integral value $G_{dc}(R)$ is smaller than that of the second integral value $G_{d'c'}(R)$.

Depending on the circumstances, consideration is made about various kinds of arcuate curves which pass through the center picture element and which are represented by $A(d_i c_j)$ wherein i=1, 2, ..., k and j=1, 2, ..., q. In this event, the integral values along the arcuate lines $A(d_i c_j)$ can be represented by G(i j) (r). Therefore, the integral values G(i j) (r) at the distance R is expressed by G(i j) (R). From this fact, it is understood that the arcuate curve $A_{dc}$ which has the same curvature and direction as that of the ridge 35 (FIG. 7) is given at the center picture element Vm by:

$$A_{dc} = A(d_i c_j)/\min G(i,j) (R). \qquad (2)$$

Thus, the curvature and the direction of the ridge are decided by calculating integration or summation of absolute values of variations of the density levels. With this method, it is possible to avoid erroneous decision of the curvature and the direction even when noise, such as dust or the like, exist on the arcuate lines $A(d_i c_j)$ and to therefore stably and smoothly carry out extraction of the curvature and the direction of each ridge.

Figure 10:
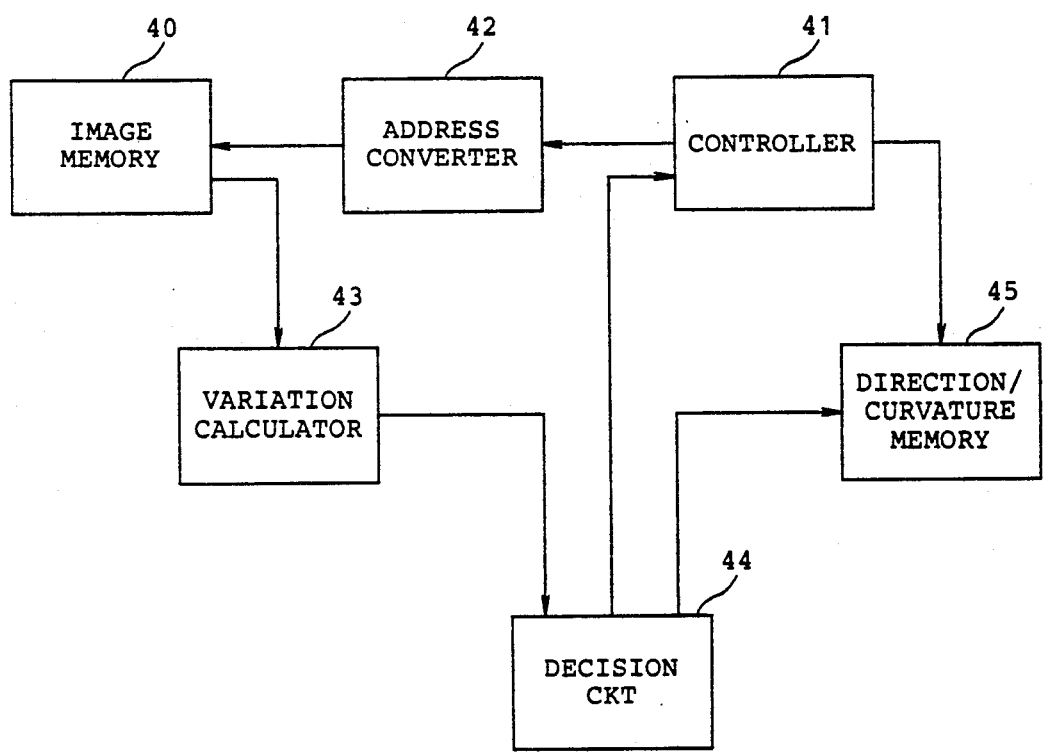
FIG. 10 is a block diagram of a fingerprint processing system according to a first embodiment of this invention.

Referring to FIG. 10, a fingerprint processing system according to a first embodiment of this invention is for use in detecting a curvature and a direction of a ridge in accordance with the above-mentioned principles. In FIG. 10, the fingerprint processing system comprises an image memory 40 for memorizing a fingerprint image which is quantized into a plurality of picture elements two-dimensionally arranged. Specifically, the image memory 40 has a plurality of memory addresses each of which is loaded with a density level of each picture element. It is assumed that all of the addresses in the image memory 40 are previously loaded with the density levels of the picture elements arranged on a plane defined by an orthogonal coordinate system having an x axis and a y axis orthogonal to the x axis.

The image memory 40 is successively given address signals in a manner to be described later from a controller 41 through an address converter 42 to specify the memory addresses of the image memory 40. At first, the controller 41 produces a reference address signal which corresponds to the center picture element placed at $x_0$ and $y_0$ on the orthogonal coordinate system and which is therefore represented by ($x_0$, $y_0$). In addition, the controller 41 indicates a selected one $A(d_i c_j)$ of the arcuate lines to read the density levels of the picture elements adjacent to the center picture element out of the image memory 40 along the selected arcuate line $A(d_i c_j)$. Practically, a selected one $d_i$ of the directions and a selected one $c_j$ of the curvatures are sent in pair from the controller 41 to the address converter 42. Moreover, the controller 41 also indicates a selected one $r_k$ of the quantization distances $r_1$ to $r_n$.

Figure 11:
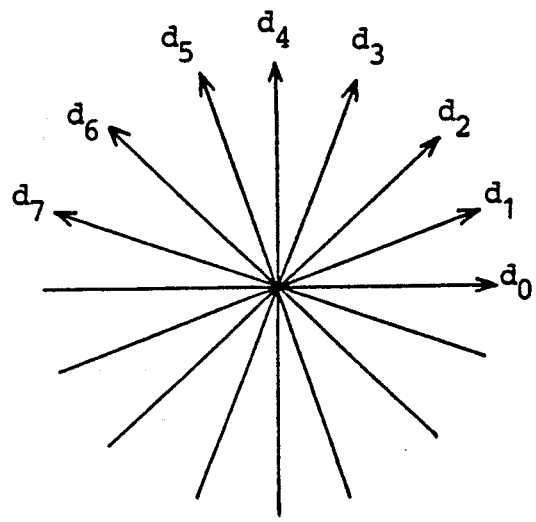
FIG. 11 shows a view for use in describing directions detected in the fingerprint processing system illustrated in FIG. 10.
Figure 12:
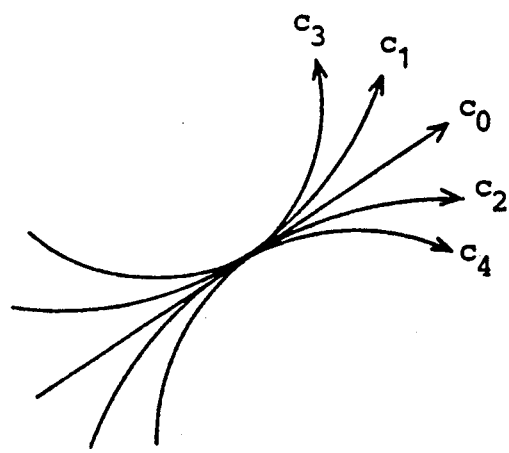
FIG. 12 shows a view for use in describing curvatures detected in the fingerprint processing system illustrated in FIG. 10.

Temporarily referring to FIGS. 11 and 12, the selected direction $d_i$ are selected from zeroth through seventh directions $d_0$ to $d_7$ illustrated in FIG. 11 while the selected curvature $c_j$ are selected from zeroth through fourth curvatures $c_0$ to $c_4$ illustrated in FIG. 12. Therefore, it is possible to indicate forty species of the arcuate lines $A(d_i c_j)$ in the example illustrated in FIGS. 11 and 12.

For brevity of description, it is assumed that a zeroth one of the arcuate lines $A(d_i c_j)$ is indicated by the controller 41. In this case, the zeroth direction $d_0$ and the zeroth curvature $c_0$ are sent from the controller 41 to the address converter 42 in addition to the reference address signal ($x_0$, $y_0$) and a first one $r_1$ of the quantization distances.

Supplied with the reference address signal ($x_0$, $y_0$), the address converter 42 illustrated in FIG. 10 converts the reference address signal ($x_0$, $y_0$) into a corresponding one of the memory addresses of the image memory 40 that may be referred to as a practical reference address. Subsequently, the address converter 42 calculates an adjacent address in response to the zeroth direction $d_0$, the zeroth curvature $c_0$, and the first quantization distance $r_1$. Thus, the address converter 42 indicates a zeroth one of the picture elements that is distant by the first quantization distance $r_1$ from the center picture element along the zeroth arcuate line $A(d_i c_j)$. Such an indication of the zeroth picture element is given by a zeroth practical address.

Responsive to the practical reference address and the zeroth practical address, the image memory 40 supplies the density levels of the center picture element and the zeroth pictures element to a variation calculator 43.

Thereafter, the controller 41 indicates the second quantization distance $r_2$ with the zeroth direction $d_0$, the zeroth curvature $c_0$, and the reference address signal ($x_0$, $y_0$) kept unchanged. As a result, the address converter 40 indicates a first one of the picture elements that is remote from the reference picture element by the second quantization distance $r_2$. Thus, the density level of the first picture element is read out of the image memory 40 to be sent to the variation calculator 43. Similar readout operation is repeated as regards the zeroth arcuate line $A(d_i c_j)$ until the n-th quantization distance $r_n$ is indicated by the controller 41 and the density level of an (n−1)-th picture element is read out of the image memory 40.

The variation calculator 43 is successively supplied with the density levels of the center picture element and the zeroth through (n−1)-th picture elements and successively sums up absolute values of differences between the density levels derived from two adjacent ones of the reference and the zeroth through (n−1)-th picture elements in accordance with Equation (1). When the summation of the absolute values is finished in connection with the density level of the (n−1)-th picture element, a result of the summation along the zeroth arcuate line $A(d_0 c_0)$ is sent from the variation calculator 43 to a decision circuit 44 and is representative of an amount of variation of the density levels along the zeroth arcuate line $A(d_0 c_0)$. The amount of variation will be called a zeroth amount of variation hereinafter.

Subsequently, the controller 41 indicates a following one of the arcuate lines that may be represented by $A(d_0 c_1)$. This shows that the zeroth curvature $c_0$ shown in FIG. 12 is changed to the first curvature $c_1$ with the zeroth direction $d_0$ kept unchanged. In a like manner, the variation calculator 43 calculates an amount of variation of the density levels along the first arcuate line $A(d_0 c_1)$ as a first amount of variation. The first amount of variation is supplied from the variation calculator 43 to the decision circuit 44. Similar operation is repeated until an amount of variation is calculated in connection with a forties one of the arcuate lines specified by $A(d_7 c_4)$ and may be called a thirty-ninth amount of variation.

After calculation of all of the zeroth through thirty-ninth amounts of variation, the decision circuit 44 decides a minimum one of the zeroth through thirty-ninth amounts of variation to indicate a decided arcuate line that is representative of the direction and the curvature of the ridge. In this event, the decision circuit 44 supplies a decided direction Dd and a decided curvature Cd to a direction and curvature memory 45 on one hand and supplies the controller 41 with a completion signal representative of completion of processing related to the center picture element in question.

The controller 41 changes the center picture element to another one and thereafter carries out an operation in a manner similar to that mentioned above. Thus, it is possible to determine the directions and the curvatures about all of the picture elements.

In the fingerprint processing system, amounts of variation of the density levels are calculated from a center picture element along various species of arcuate lines specified by direction and curvatures to detect a minimum one of the amounts of variation. Accordingly, a direction and a curvature of a ridge is correctly determined even when the ridge has a large curvature. This is because an arcuate line can be selected along a ridge curve of a ridge without intersecting any other ridges.

Figure 13:
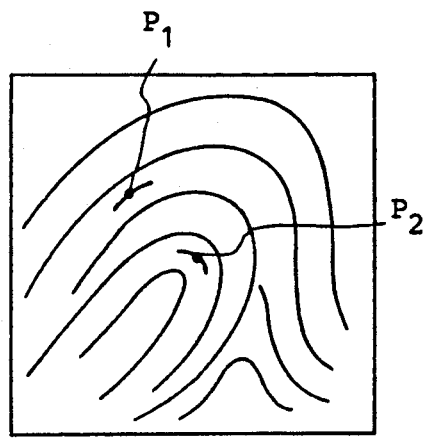
FIG. 13 shows a fingerprint image used to describe another principle of this invention.

Referring to FIGS. 13 through 16, description will be made about another principle of this invention to detect a position of a core, namely, a core position (will be represented by CP) in a fingerprint image by the use of directions and curvatures of ridges in a manner described in conjunction with FIG. 10. In such directions and curvatures in the quantized picture elements may be also extracted in the manners disclosed in Japanese Patent Publications Nos. Syô 52-97258 (97258/1977) and Syô 55-138174 (138174/1980). In FIG. 13, a loop type fingerprint image is exemplified and is assumed to be quantized into a plurality of picture elements two-dimensionally arranged on a plane. Herein, it is assumed that directions and curvatures are given at first and second ones P1 and P2 of picture elements that are located at first and second positions on the fingerprint image.

It is to be noted that a direction and a curvature of each picture element relatively has a strong correlation to the core position CP. In other words, the direction and the curvature of each picture element are concerned with a relative position of the core in the fingerprint image. This shows that it is possible to calculate, from the direction and the curvature in each picture element, existence probabilities of the relative position of the core in relation to each picture element and picture elements adjacent to each picture element. Thus, the direction and the curvature of each picture element can define the existence probabilities in relation to both each picture element and the picture elements adjacent to each picture element. In particular, the existence probabilities of the relative position of the core at the adjacent picture elements may be referred to as adjacent existence probabilities.

Taking this into consideration, investigation is statistically made about a relationship between a direction and a curvature in each picture element and the relative position of the core so as to absolutely determine the core position CP. More specifically, when one of the picture elements is selected as a selected picture element at which a direction and a curvature are given, the adjacent existence probabilities are calculated for the picture elements adjacent to the selected picture element.

Figure 14:
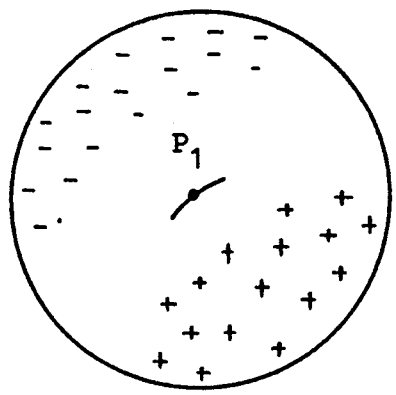
FIG. 14 shows an enlarged view for use in describing existence probabilities of a core position at a part of the fingerprint image illustrated in FIG. 13.
Figure 15:
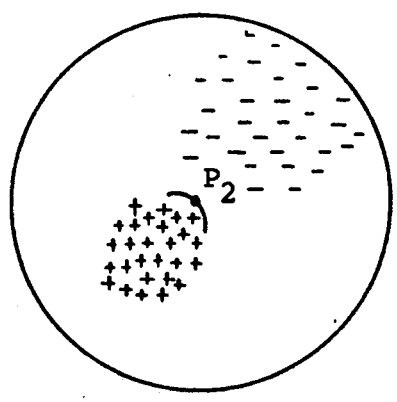
FIG. 15 shows another enlarged view for use in describing existence probabilities of the core position at another part of the fingerprint image illustrated in FIG. 13.

In FIG. 13, the adjacent existence probabilities are calculated in relation to the first and the second picture elements P1 and P2. When the adjacent existence probabilities are calculated or estimated in connection with the first picture element P1, it is possible to obtain a first probability distribution as illustrated in FIG. 14. Likewise, a second probability distribution as shown in FIG. 15 is obtained when the adjacent existence probabilities are calculated or estimated in connection with the second picture element P2. In FIGS. 13 and 14, a plus sign (+) is representative of a high existence probability while a minus sign (−) is representative of a low existence probability. From this fact, it may be concluded that the existence probabilities become high as a density of the plus signs (+) becomes high while the existence probabilities become low as a density of the minus signs (−) becomes high. As shown in FIGS. 14 and 15, the existence probabilities of the relative position of the core are high on a side of a center of curvature as compared with an opposite side of the center of curvature.

Figure 16:
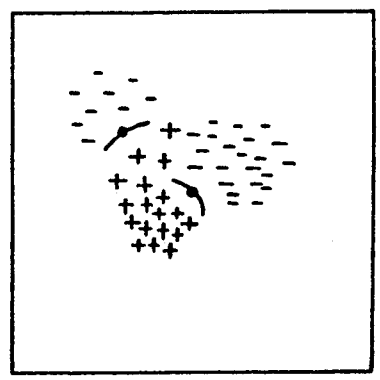
FIG. 16 shows existence probabilities of the core position which are calculated from those illustrated in FIGS. 14 and 15.

The first probability distribution illustrated in FIG. 14 is superposed on the second probability distribution illustrated in FIG. 15 to provide a third distribution as illustrated in FIG. 16. Practically, the existence probabilities for the first and the second picture elements P1 and P2 may be summed up to each other. As is apparent from FIG. 16, the existence probabilities of the core position are localized in comparison with the first and the second probability distributions at an area adjacent to the second picture element P2. From this fact, it is understood that, if similar operations are repeated about all of the picture elements, the existence probabilities take a maximum value at the core position CP. Accordingly, the core position can be correctly determined in the fingerprint in question.

Figure 17:
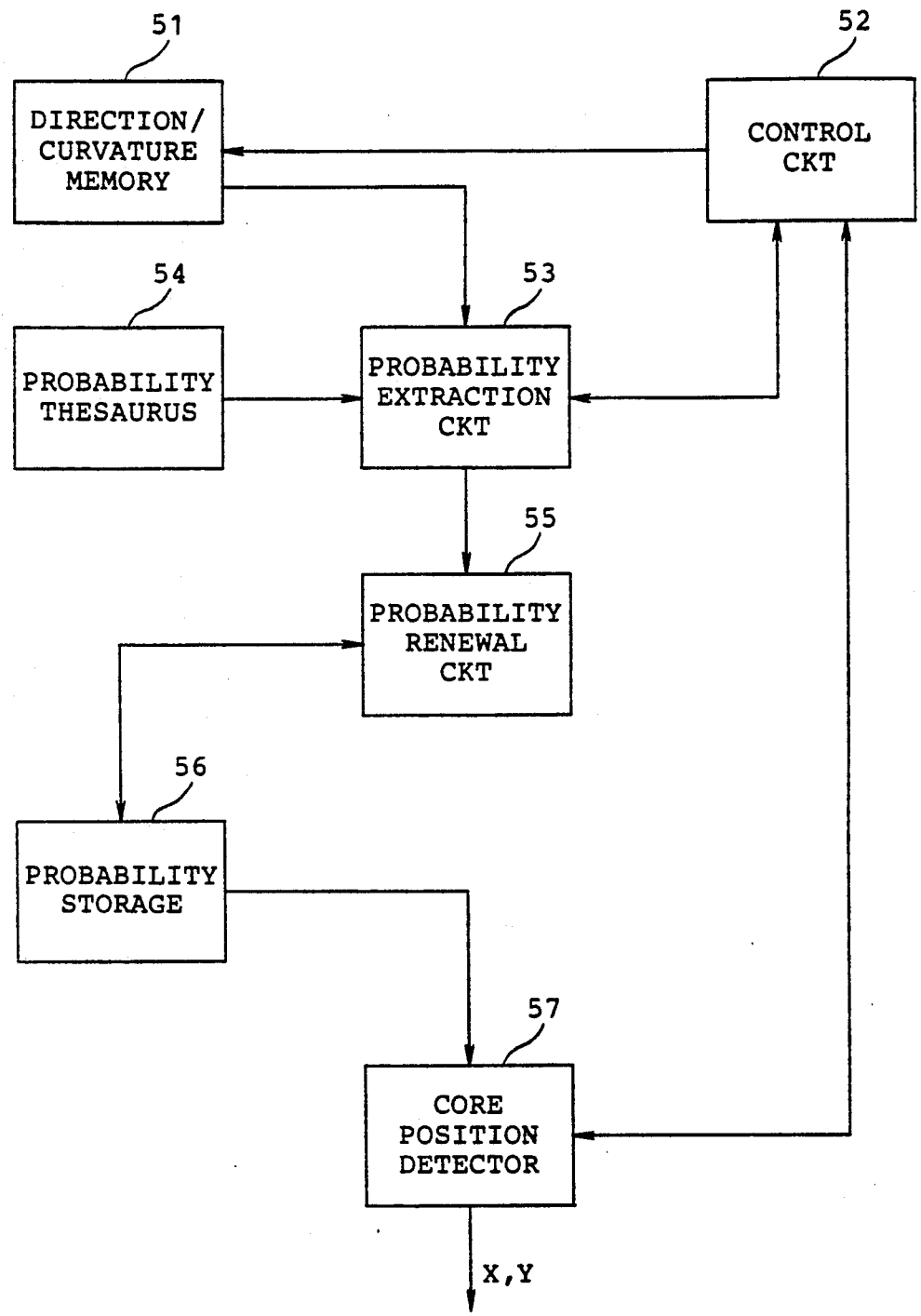
FIG. 17 is a block diagram of a fingerprint processing system according to a second embodiment of this invention, which is operable in accordance with the principle described in conjunction with FIGS. 13 through 16.

Referring to FIG. 17 together with FIGS. 11 and 12, a fingerprint processing system according to a second embodiment of this invention is for use in determining a core position of a fingerprint image in accordance with the above-mentioned principle. In the example being illustrated, the fingerprint processing system comprises a direction and curvature memory 51 for memorizing direction signals and curvature signals for the respective picture elements in the manner illustrated in FIGS. 11 and 12. The picture elements may be recognized as being arranged two-dimensionally in the direction and curvature memory 51. The positions of the picture elements can be specified by a coordinate position (x, y) without any loss of generality. Specifically, each of the direction signals represents one of the zeroth through seventh directions $d_0$ to $d_7$ while each of the curvature signals represents the zeroth through the fifth curvatures $c_0$ to $c_4$, as shown in FIGS. 11 and 12.

Like in FIG. 7, an arcuate line $A_{dc}$ is defined by a combination of one of the zeroth through seventh directions $d_0$ to $d_7$ and one of the zeroth through fourth curvatures $c_0$ to $c_4$.

In FIGS. 18 and 19, the arcuate lines $A_{dc}$ are exemplified as A(1 4) and A(5 3), respectively, where first and second suffixes attached to A(1 4) and A(5 3) are representative of the number of the directions and the number of the curvatures, respectively, although d and c are omitted from FIGS. 18 and 19 unlike in FIGS. 11 and 12 for simplicity of description. Specifically, the arcuate line A(1 4) of FIG. 18 has the direction of $d_1$ (FIG. 11) and the curvature of $c_4$ (FIG. 12) while the arcuate line A(5 3) of FIG. 19 has the direction of $d_5$ and the curvature of $c_3$.

The direction signals and the curvature signals are read out of the direction and curvature memory 51 in pairs under control of a control circuit 52 at every one of the picture elements in the fingerprint in question to be sent to a probability extraction circuit 53. In this event, the control circuit 52 supplies the direction and curvature memory 51 with a memory address signal which specifies a memory address corresponding to the indicated or reference picture element placed at the coordinate position (x, y).

The probability extraction circuit 53 is given the direction and curvature signals read out of the direction and curvature memory 51. The direction and the curvature signals read out of the above-mentioned memory address represent one of the arcuate curves that may be generally represented by $A_{dc}(x, y)$. Supplied with the direction and the curvature signals ($A_{dc}(x,y)$), the probability extraction circuit 53 is operable under control of the control circuit 52 to cooperate with a probability thesaurus 54. The probability thesaurus 54 has a plurality of thesaurus addresses which correspond to the pairs of the direction and the curvature signals and which are equal, for example, to forty in the example being illustrated.

Referring to FIGS. 20 and 21, exemplification is made about first and second specific probability distributions corresponding to the arcuate lines A(1 4) and A(5 3) which are illustrated in FIGS. 18 and 19, respectively, and which are extended from the indicated picture element. In FIGS. 20 and 21, the first and the second specific probability distributions represent the existence probabilities at the indicated picture elements (located at a center in FIGS. 20 and 21 and enclosed by solid lines) and the adjacent existence probabilities at the picture elements around the indicated picture elements. The adjacent existence probabilities are illustrated as regards three picture elements arranged from the indicated picture elements towards four directions, namely, upwards, downwards, rightwards, and leftwards. It is preferable that the number of the adjacent picture elements is increased insofar as a processing time is acceptable. The existence probability and the adjacent existence probabilities may be called relative existence probabilities because they are related to restricted or normalized picture elements which are not present on the coordinate system.

In FIGS. 20 and 21, positive and negative numbers are representative of the existence probabilities of the core position CP at relative positions. As the positive number, such as +1, +2, +3, +4, +5, is increased in each picture element in FIGS. 20 and 21, the existence probability becomes high at the relative positions. By contraries, the existence probability becomes low as an absolute value of the negative number is decreased in each picture element. As shown in FIG. 20, the arcuate line A(1 4) has a high existence probability of the core at the relative positions at a right lower portion while the arcuate line A(5 3) has a high existence probability at a left lower portion in FIG. 21.

At any rate, the probability thesaurus 54 (FIG. 17) is loaded with probability distributions in one-to-one correspondence to the arcuate lines in a manner similar to those illustrated in FIGS. 20 and 21. Specifically, the probability thesaurus 54 is loaded with the relative existence probabilities corresponding to the direction and the curvature specified by the arcuate line $A_{dc}$.

In FIG. 17, the probability extraction circuit 53 accesses the probability thesaurus 54 in response to the direction and the curvature signals $A_{dc}(x, y)$ read out of the direction and curvature memory 51. In this event, the probability thesaurus 54 supplies the probability extraction circuit 53 with the relative existence probabilities, as shown in FIGS. 20 and 21. More specifically, the probability extraction circuit 53 is successively given not only the relative existence probability depicted at w(0, 0) at the center of FIGS. 20 and 21 but also the relative adjacent existence probabilities which are depicted at $2(\Delta x, \Delta y)$ and which are located around the center, where $\Delta x$, $\Delta y$ are representative of adjacent relative coordinate positions. It is to be noted that the relative existence probability and the relative adjacent existence probabilities both of which are read out of the probability thesaurus 54 are specified by relative or normalized coordinate positions, as understood from FIGS. 20 and 21. Accordingly, the probability extraction circuit 53 converts the relative addresses of the relative existence probabilities into corresponding physical or absolute coordinate positions on the fingerprint image in question. To this end, the probability extraction circuit 53 calculates the absolute coordinate positions from the coordinate position (x, y) and the relative coordinate positions $\Delta x$, $\Delta y$ to produce the absolute coordinate positions $(x+\Delta x, y+\Delta y)$. Thus, the adjacent existence probabilities $w(\Delta x, \Delta y)$ and the absolute coordinate positions $(x+\Delta x, y+\Delta y)$ are sent from the probability extraction circuit 53 to a probability renewal circuit 55 coupled to a probability storage 56 all contents of which are reset into zero at the beginning of processing.

Supplied with the absolute coordinate positions $(x+\Delta x, y+\Delta y)$ and the adjacent existence probabilities $w(x+\Delta x, y+\Delta y)$ from the probability extraction circuit 53, the probability renewal circuit 55 accesses the probability storage 56 to extract, from the probability storage, present existence probabilities which are stored at a current time instant $t_0$ and which are represented by $w_0(x+\Delta x, y+\Delta y)$. Subsequently, the probability renewal circuit 55 calculates a following probability sum from both the adjacent existence probabilities $w(x+\Delta x, y+\Delta y)$ and the present existence probabilities $w_0(x+\Delta x, y+\Delta y)$. The following probability sum is returned back to the probability storage 56 to be written therein again.

Although the probability sum is calculated by the probability renewal circuit 55 in the illustrated example, other calculations, such as multiplication, can be carried out in the probability renewal circuit 55.

Similar operation are successively carried out about all of the picture elements. The resultant existence probabilities take a highest value at the core position CP. When the probability storage 56 is loaded with the existence probabilities related to the picture elements, the control circuit 52 energizes a core position detector 57. The core position detector 57 detects the picture element having the highest value of the existence probabilities and produces the corresponding coordinate position as the core position CP. Alternatively, weighted mean values may be calculated in relation to the existence probabilities of the adjacent picture elements on detection of the core position to select a maximum one of the weighted mean values and to determine, as the core position, the picture element corresponding to the maximum mean value.

In addition, a pair of a direction and a curvature may be defined at every area composed of a plurality of picture elements to detect the core position of the fingerprint image at a high speed, although a pair of the direction and the curvature is defined at every picture element in the above-mentioned example.

In the above-mentioned example, the core position has been defined from a pair of a direction and a curvature extracted from a single one of the picture elements. However, it is possible to define the core position by monitoring a combination of directions and curvatures extracted from a plurality of the picture elements.

With this structure, a core position can be detected even when the fingerprint image has a triangle portion, as shown in FIG. 6, or partial unclearness, as shown in FIGS. 4 and 5. In addition, the core position can be detected from a fingerprint image of an arch type.

In FIG. 17, the control circuit 52, the probability thesaurus 54, the probability extraction circuit 53, the probability renewal circuit 55, and the probability storage 56 may be collectively referred to as a statistically processing circuit for statistically processing the existence probabilities dependent upon the directions and the curvatures. In addition, the probability extraction circuit 53 may be called an accessing circuit for accessing the probability thesaurus 54 to produce the relative probabilities and location signals representative of the picture elements given the relative probabilities while the probability renewal circuit 55 may be called a calculation circuit for statistically calculating practical existence probabilities.

Figure 22:
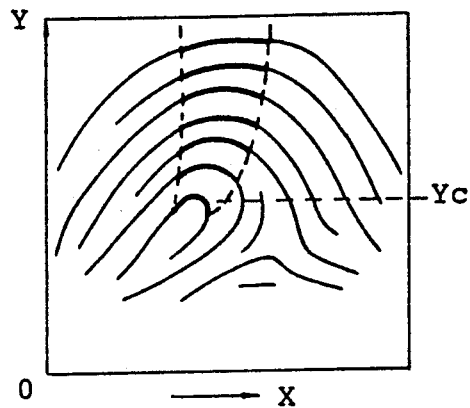
FIG. 22 shows a view of a fingerprint image for use in describing still another principle of this invention.

Referring to FIGS. 22 through 25, description will be made as regards another principle of this invention that is for use in detecting a core position in each of fingerprint images from directions and curvatures. In FIG. 22, a loop type of fingerprint image is exemplified as the fingerprint image and is composed of a plurality of picture elements which are arranged in an orthogonal coordinate system defined by an X axis (namely, an abscissa) and a Y axis (namely, an ordinate) orthogonal to the X axis. The fingerprint image comprises a plurality of loop-shaped and convex ridges with furrows left between two adjacent ones of the ridges and are placed so that the ridges become convex upwards relative to the X axis. The resultant ridges form upward convex curves having upward curvatures, as illustrated in FIG. 22. Each of the ridges has a top portion which is specified by a Y coordinate position on the Y axis. Under the circumstances, let the upward curvatures be detected from the picture elements arranged along horizontal lines parallel to the X axis. It is to be noted here that a maximum one of the upward curvatures is given at each top portion of the ridges or a portion adjacent to each top portion along each of the horizontal lines. In this connection, the ridges have the maximum curvatures in areas illustrated by thick lines in FIG. 22.

Figure 23:
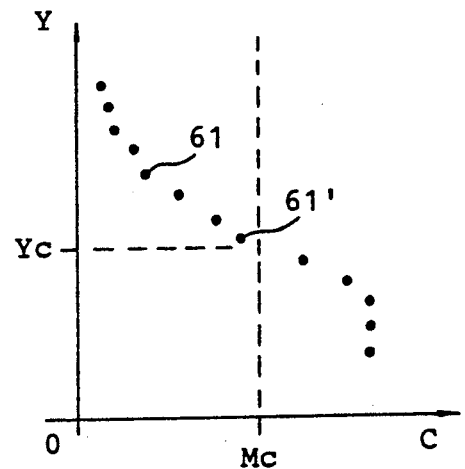
FIG. 23 shows a graphical representation for use in describing a relationship between coordinate positions and a curvature distribution derived from the fingerprint image illustrated in FIG. 22.

Now, it is assumed that the directions and the curvatures are preliminarily extracted at the respective picture elements from the illustrated fingerprint image in the manner described in conjunction with FIG. 10. Let the maximum curvatures be detected along the horizontal lines from the illustrated fingerprint image. In this event, the maximum curvatures are extracted from the areas shown by the thick lines in FIG. 22 and are plotted on a plane defined by a curvature axis C and a Y axis, as shown in FIG. 23. As a result, a discrete maximum curvature curve 61 is obtained from the loop type fingerprint image.

More specifically, the maximum curvatures along the horizontal lines gradually and successively become large from an upper portion of the fingerprint image towards a center portion thereof and reach a maximal value at the center portion. Thereafter, no upward convex curve is detected at a portion lower than the center portion.

Taking this into consideration, let a presumable or provisional maximum curvature Mc be defined in the upward curvatures of the ridges formed by the upwards convex curves. In addition, curvatures greater than the presumable maximum curvature are assumed to be given to a portion lower than the center portion of the fingerprint image.

In this case, the upward curvatures approach to the presumable maximum curvature Mc between the upper and the center portions of the illustrated fingerprint image. Thereafter, the curvatures are monotonically increased from the upper portion to the lower portion, as illustrated in FIG. 23, and exceed the presumable maximum curvature Mc at a coordinate position nearest to the center portion. Therefore, it is possible to correctly determine the core position by selecting a specific one 61' of the curvatures detected immediately before the presumable maximum curvature. In the example being illustrated, the core position is specified by the Y coordinate position Yc of the specific curvature 61' and is correctly coincident with a practical core position of the fingerprint image when the center portion is clear in the fingerprint image.

Figure 24:
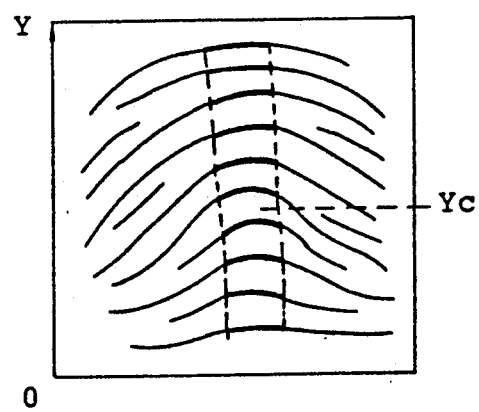
FIG. 24 shows a view of another fingerprint image for use in describing the principle described in conjunction with FIG. 22.
Figure 25:
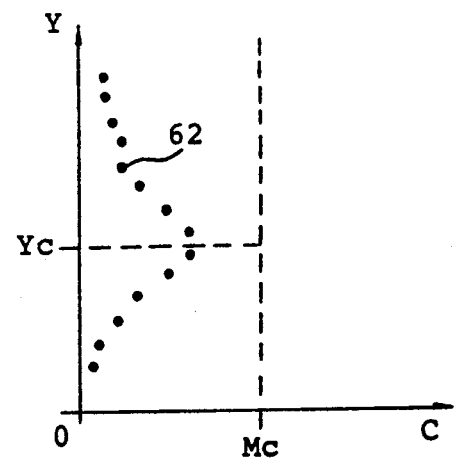
FIG. 25 shows another graphical representation for use in describing a relationship between coordinate positions and another curvature distribution derived from the fingerprint image illustrated in FIG. 24.

In FIGS. 24 and 25, similar operation is carried out as regards the arch type fingerprint image as illustrated in FIG. 24 to obtain a similar maximum curvature curve which is depicted at 62 in FIG. 25 and which is an approximate curve of the arch type fingerprint image. As illustrated in FIG. 25, the maximum curvature curve 62 has an angle shape having a peak curvature. Therefore, it is possible to correctly determine the core position by selecting the peak curvature and by taking a Y coordinate position at a position of the peak curvature even when the fingerprint image is of an arch type.

Figure 26:
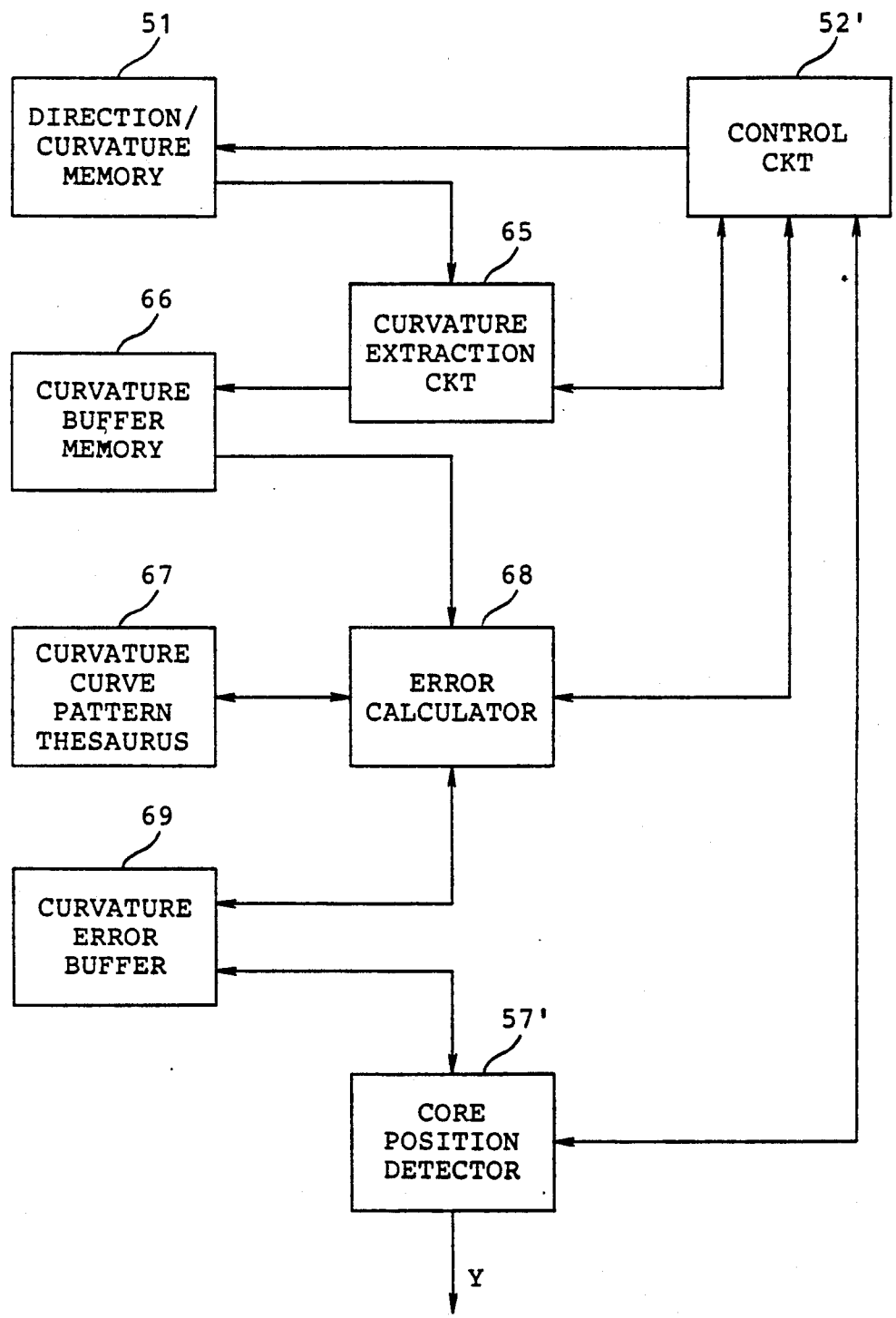
FIG. 26 is a block diagram of a fingerprint processing system according to a third embodiment of this invention, which is operable in accordance with the principle mentioned in conjunction with FIGS. 22 through 25.

Referring to FIG. 26, a fingerprint processing system according to a third embodiment of this invention is for use in determining a core position of a fingerprint image in accordance with the principle mentioned in conjunction with FIGS. 22 to 25. The illustrated fingerprint processing system comprises a direction and curvature memory 51, like in FIG. 17, in addition to a control circuit 52' which is operable in a manner different from that illustrated in FIG. 17, as will become clear as the description proceeds. A core position detector 57' is included in the illustrated system and is similar in operation to that illustrated in FIG. 17 except that a Y coordinate position Y alone is produced as the core position from the illustrated core position detector 57'. The direction and curvature memory 51 is preliminarily loaded with direction and curvature signals which are extracted from the respective picture elements in the manner mentioned before. The picture elements are arranged in an orthogonal coordinate system and are located at positions represented by (x, y), respectively. The pairs of the direction and the curvature signals are in one-to-one correspondence to the positions of the picture elements and are successively read out of the direction and curvature memory 51 under control of the control circuit 52.

In the example being illustrated, the direction and the curvature signals are ready from memory addresses which correspond to the picture elements arranged along the horizontal lines, as described in FIGS. 22 to 25. Such horizontal lines are successively shifted downwards of FIGS. 22 and 24. At any rate, processing is carried out in the illustrated system to extract upward curvatures of convex ridge curves relative to the X axis and to determine the Y coordinate position Y of the core position.

More particularly, the direction and the curvature signals for a single one of the horizontal lines are delivered from the direction and curvature memory 51 to a curvature extraction circuit 65 which is operable under control of the control circuit 52' to extract the upward curvatures from the curvature signals for each horizontal line. Thereafter, a maximum one of the upward curvatures is determined for the picture elements of each horizontal line, as mentioned in conjunction with FIGS. 22 through 25. The maximum curvatures for the horizontal lines are successively detected by the curvature extraction circuit 65 to be sent to a curvature buffer memory 66 and to be stored as practical curvature signals therein. Specifically, when consideration is made about the curvatures corresponding to the picture elements which are placed at Yn along the Y axis and which are represented by (Xm, Yn) where m is variable between 1 and M with Yn fixed. In other words, the curvatures of the picture elements (X1, Yn), (X2, Yn), . . . , (Xm, Yn) are extracted from the direction and curvature memory 51 to select a maximum one of the curvatures that is produced as the practical curvature signal. Thereafter, Yn is changed to carry out a similar operation and to produce a following maximum curvature. Thus, n is variable between 1 and N.

Figure 27:
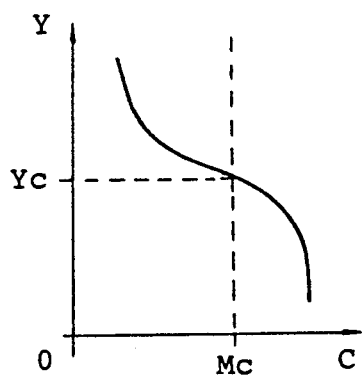
FIGS. 27 and 28 exemplify curvature curves used in the fingerprint processing system illustrated in FIG. 26.
Figure 28:
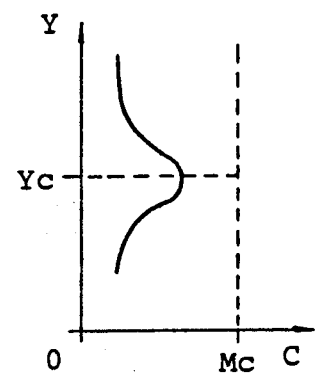

Referring to FIGS. 27 and 28 together with FIG. 26, the fingerprint processing system illustrated in FIG. 26 comprises a curvature curve thesaurus 67 for memorizing a plurality of curvature curve patterns which define reference curvature curves as exemplified in FIGS. 27 to 28. The curvature curve patterns illustrated in FIGS. 27 and 28 specify a loop type fingerprint image and an arch type fingerprint image which may be made to correspond to the maximum curvature curves illustrated in FIGS. 23 and 25, respectively, and are memorized in the curvature curve pattern thesaurus 67 in the form of sequences of digital signals each of which is representative of the above-mentioned maximum curvature and which is sent to an error calculator 68. Such sequences of digital signals may be referred to as curvature sequences. Practically, the curvature curve patterns can be obtained by approximating actual typical fingerprint images by the use of a relevant function f. For example, each of the maximum curvatures Cn is given by:

$$Cn = f(Yn),$$

where n=1, 2, ..., N.

The error calculator 68 is supplied from the curvature buffer memory 66 and the curvature curve pattern thesaurus 67 with the practical curvature signals and the curvature sequences, respectively. At first, a selected one of the curvature sequences is representative of a selected one of the curvature curve patterns and is read out of the curvature buffer memory 66 to be sent to the error calculator 68. In this case, a selected one of presumable or provisional core positions Yc is also read out of the curvature curve pattern thesaurus 67. Under the circumstances, the error calculator 68 statistically calculates an error between the selected curvature sequence and the practical curvature signals with respect to the selected presumable core position by the use of a method of least squares. Such an error is representative of a difference d between the selected curvature sequence and the practical curvature signals. The difference d is given, for example, by:

$$d = \sum_{n=1}^{N} |Cn - f(n)|/2$$

Thereafter, the selected curvature curve pattern is shifted in parallel along the Y axis by $y_a$ to calculate a difference d(y) in a manner mentioned above. In this case, the difference $d(y_a)$ is given by:

$$d(y_a) = \sum_{n=1}^{N} |Cn - f(n - y_a)|^2.$$

In any event, a minimum value of the differences is calculated in connection with the selected curvature curve pattern by varying the presumable core positions from the selected presumable core position Yc. Let $d(y_a)$ take the minimum value when $y_a$ is equal to $y_a'$. In this case, an estimation value of a Y coordinate position of the core position is represented by $(Yc + y_a')$. The minimum value of the differences is stored as an error signal into a curvature error buffer 69 together with the estimation value $(Yc + y_a')$ of the Y coordinate position.

Similar operations are successively carried out by the error calculator 68 about all of the curvature curve patterns memorized in the curvature curve pattern thesaurus 67 to calculate minimum values of differences and the corresponding estimation values of the Y coordinate positions. When the minimum values and the corresponding estimation values are calculated about all of the curvature curve patterns, the curvature error buffer 69 is accessed by a core position detector 57' under control of the control circuit 52'. The core position detector 57' detects a minimal one of the minimum values and the corresponding Y coordinate position. The Y coordinate position is sent as a core position signal representative of the Y coordinate position of the core position.

In FIG. 26, the control circuit 52', the curvature extraction circuit 65, the curvature buffer memory 66, the error calculator 68, the curvature curve pattern thesaurus 67, and the curvature error buffer 69 may be collectively called a statistically processing circuit for processing the curvatures and the directions to provide a curvature distribution curve as shown in FIGS. 23 and 25 and to statistically detect differences or errors between the curvature distribution curve and the reference curves (the curvature curve patterns). In this connection, the error calculator 68 may be referred as as a calculation circuit for statistically calculating the differences to produce a minimum one of the differences and the corresponding presumable coordinate position at every one of the reference curves.

Figure 29:
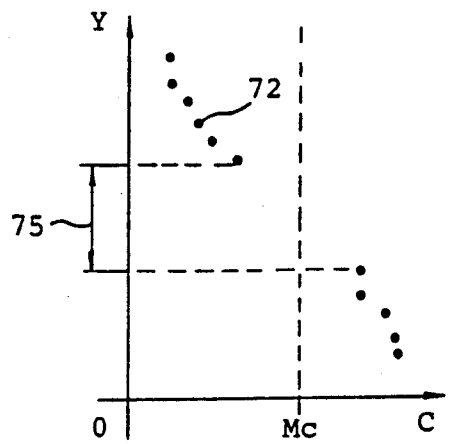
FIGS. 29 and 30 exemplify practical curvature curves extracted from practical fingerprint images with unclear portions left in the curves.
Figure 31:
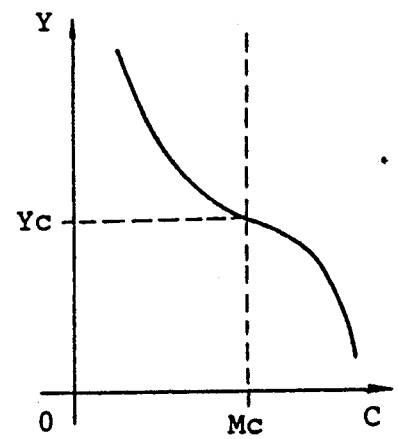
FIGS. 31 and 32 exemplify reference curvature curves made to correspond to the practical curvature curves illustrated in FIGS. 29 and 30, respectively.
Figure 30:
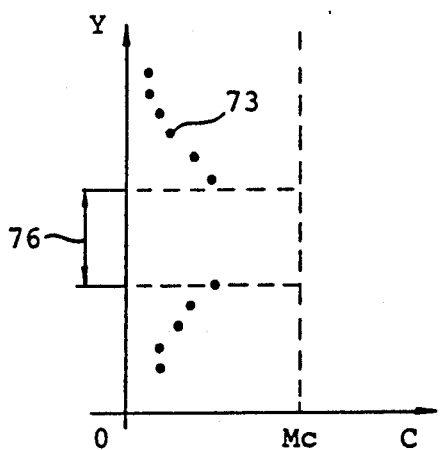
Figure 32:
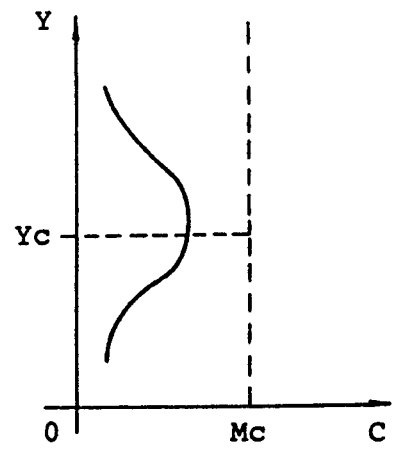

Referring to FIGS. 29 and 30, discontinuity takes place in practical curvature curves 72 and 73 calculated from the directions and the curvatures memorized in the directions and curvature memory 51 due to unclear zones 75 and 76 of fingerprint images. The unclear zones 75 and 76 are present at center portions of the fingerprint images. Even when such discontinuity takes place, a Y coordinate position Yc of the core position can be determined by making the practical curvature curves 72 and 73 correspond to curvature curve patterns 77 and 78 as illustrated in FIGS. 31 and 32, respectively.

What is claimed is:

1. A fingerprint processing system for use in detecting a position of a core in a fingerprint image which has a plurality of ridges, each having a curvature and a direction, said ridges being quantized into picture elements together with their background, said system comprising a direction and curvature memory having a plurality of memory addresses in correspondence to said picture elements, respectively, for memorizing curvature signals and direction signals and a processing unit coupled to said curvature and direction memory for successively processing said curvature signals and said direction signals to detect said position, said curvature and said direction signals being extracted from said picture elements to represent the curvatures and the directions, respectively, the improvement wherein:

said processing unit comprises:

statistically processing means coupled to said curvature and direction memory for successively and statistically processing said curvature and said direction signals at said picture elements to calculate parameters defined by existence probabilities of said position which are calculated in correspondence to combinations of said directions and said curvatures of the ridges; and position determining means connected to said statistically processing means for determining said position from the parameters;

said statistically processing means comprising:

a probability thesaurus having a plurality of thesaurus addresses corresponding to combinations of said curvatures and said directions of the ridges for memorizing, in each of said thesaurus addresses, a relative existence probability set of said position which is calculated in relation to a normalized reference picture element and a plurality of adjacent normalized picture elements adjacent to said normalized reference picture element to produce said relative existence probability set, said relative existence probability set being produced one at a time in response to said combinations;

accessing means coupled to said curvature and direction memory and said probability thesaurus and successively supplied with the curvature and the direction signals memorized at each of said memory addresses for accessing said probability thesaurus to extract the relative existence probability set from the thesaurus address corresponding to said combination of the curvature and the direction signals and to produce the relative existence probability set together with a set of location signals representing, on said fingerprint image, locations of the picture elements given said relative existence probabilities, respectively;

existence probability memory means for memorizing practical existence probabilities of said position at the picture elements on said fingerprint image to produce practical existence probability signals representative of the memorized practical existence probabilities, respectively; and calculation circuit means coupled to said accessing means and said existence probability memory means for successively and statistically calculating, as said parameters, the practical existence probabilities for said picture elements on said fingerprint image, said practical existence probabilities having a maximum value at the location indicated by the selected one of said location signals;

said position determining means being coupled to said existence probability memory means to determine said position of the core from said parameters memorized in said existence probability memory means.

2. A fingerprint processing system for use in detecting a position of a core in a fingerprint image which has a plurality of ridges, each having a curvature and a direction, said ridges being quantized into picture elements together with their background, said system comprising a direction and curvature memory having a plurality of memory addresses in correspondence to said picture elements, respectively, for memorizing curvature signals and direction signals and a processing unit coupled to said curvature and direction memory for successively processing said curvature signals and said direction signals to detect said position, said curvature and said direction signals being extracted from said picture elements to represent the curvatures and the directions, respectively, the improvement wherein:

said processing unit comprises:

statistically processing means coupled to said curvature and direction memory for successively and statistically processing said curvature and said direction signals at said picture elements to calculate parameters variable in dependency upon said position and upon said curvatures and said directions of the ridges; and position determining means connected to said statistically processing means for determining said position from the parameters;

said fingerprint image being impressed on a plane defined by a coordinate system having a first axis and a second axis orthogonal to said first axis, said ridges having convex curves relative to said first axis, wherein said statistically processing means comprises:

curvature detecting means coupled to said direction and curvature memory for detecting a maximum one of the curvatures of the picture elements arranged along said first axis at every one of coordinate positions placed along said second axis to successively produce the maximum ones of the curvatures and the corresponding positions as detected curvatures and detected positions;

a curvature thesaurus for memorizing a plurality of reference curves representative of specific fingerprint images, each of said reference curves being specified by a plurality of reference curvatures and the corresponding curvature positions placed along said second axis, together with a provisional coordinate position of the core related to each of said reference curvature curves; and calculating means coupled to said curvature detecting means and said curvature thesaurus for statistically calculating errors between the detected curvatures and said reference curvatures with reference to said detected positions and the curvature positions by changing said provisional coordinate position to another, said reference curvatures and said provisional coordinate position specifying a selected one of said reference curves, said calculating means being for producing, as said parameters, a minimum one of said errors and the corresponding provisional position that correspond to said minimum one of the errors, said minimum one of the errors and the corresponding provisional coordinate position being calculated for every one of said reference curves as calculated minimum errors and calculated provisional coordinate positions;

said position determining means selecting a minimal one of said calculated minimum errors to determine as said position one of the calculated provisional coordinate positions that corresponds to said minimal one of said calculated minimum errors.

* * * * *

UNITED STATES PATENT AND TRADEMARK OFFICE
CERTIFICATE OF CORRECTION

PATENT NO. : 5,040,224

DATED : August 13, 1991

INVENTOR(S) : Masanori HARA

It is certified that error appears in the above-identified patent and that said Letters Patent is hereby corrected as shown below:

Col. 1, line 58, delete "portion" insert --position--;

Col. 11, line 30, delete "2" and insert --w--.

Signed and Sealed this

Twenty-seventh Day of April, 1993

Attest:

MICHAEL K. KIRK

Attesting Officer

Acting Commissioner of Patents and Trademarks